United States Patent [19]

Weatherly

[11] Patent Number: 4,596,134
[45] Date of Patent: Jun. 24, 1986

[54] METHOD AND APPARATUS FOR SIMULATING SMOKING THROUGH CIGARETTE FILTER TIPS TO DETERMINE PERCENTAGE OF COLLAPSE

[75] Inventor: Charles H. Weatherly, Kingsport, Tenn.

[73] Assignee: Eastman Kodak Company, Rochester, N.Y.

[21] Appl. No.: 740,162

[22] Filed: Jun. 3, 1985

[51] Int. Cl.[4] .............................................. G01M 3/36
[52] U.S. Cl. ...................................................... 73/38
[58] Field of Search ........... 73/432 SD, 432 Z, 432 J, 73/38

[56] References Cited

U.S. PATENT DOCUMENTS

| | | | |
|---|---|---|---|
| 3,204,449 | 9/1965 | Fordyce | 73/38 |
| 3,668,928 | 6/1972 | Strydom | 73/38 |
| 4,181,007 | 1/1980 | Arisaka et al. | 73/38 |

*Primary Examiner*—Stewart J. Levy
*Assistant Examiner*—Robert R. Raevis
*Attorney, Agent, or Firm*—Malcolm G. Dunn; William P. Heath, Jr.

[57] ABSTRACT

Method and apparatus for simulating smoking through a cigarette filter tip by metering a controlled amount of heated water vapor for a controlled period of time through a cigarette filter tip and thereafter determining the percentage of collapse of the resulting wetted and heated filter tip.

7 Claims, 3 Drawing Figures

METHOD AND APPARATUS FOR SIMULATING SMOKING THROUGH CIGARETTE FILTER TIPS TO DETERMINE PERCENTAGE OF COLLAPSE

TECHNICAL FIELD

The present invention is directed to a method and apparatus for simulating smoking through a cigarette filter tip and determining its percentage of collapse.

BACKGROUND

Cellulose acetate tow cigarette filter tips sometimes soften during smoking of the cigarette thus reducing the filter tip effectiveness as a mouthpiece. This is especially true with the use of low denier per filament tow currently being used to achieve high filtration. This phenomenon is referred to as "filter collapse." Since the smoker thinks of the filter as the cigarette mouthpiece and is, therefore, most aware of the filter's rigidity, this collapse behavior creates an unpleasant sensation for the smoker because the "mouthpiece" then has a mushy feeling. This is considered extremely undesirable by most cigarette manufacturers. In extreme cases, as the filter tip softens, the tow partially separates from the wrap around the cellulose acetate tow, causing a reduction in the effectiveness of the filter tip for filtering smoke components.

In general, the factors that improve cold filter tip firmness also increase the resistance to collapse of the hot filter tip. However, it has been found that high levels of plasticizer application, which improve cold filter tip firmness, decrease the resistance to collapse for the hot filter tip.

In studies of collapse in which firmness is measured continuously on a filter tip as the cigarette is smoked, the results indicate that most softening occurs during the last two or three puffs, and the principle cause of filter collapse has been found to be the delivery of hot moisture to the filter tip.

In support of the last statement above, in a paper entitled "The Hardness of Cellulose Acetate Filters During Smoking" by J.N.T. White (presented at the CORESTA Symposium, November, 1982, and published by Courtaulds Acetate Limited, Cigarette Tow Division, Technical Services Dept., P.O. Box 13, Little Heath, Conventry, England), it was reported that temperature was not the only factor causing filters to soften. When hot air was drawn continuously through a filter so that the temperature within the filter element rose to the maximum found during smoking (about 80° C.), very little softening occurred. If this hot air carried cigarette smoke with it, the softening increased and the effect was greater as the smoke concentration increased. The author made the conclusion that it appeared that a combination of smoke and temperature causes softening during smoking. The author expressed the thought that the contribution of the smoke may have a plasticizing effect on the fibers (of the tow making up the content of the filter) perhaps due to its water content. The author then said that the effect of water could be illustrated by drawing steamladen air through a filter instead of smoke-laden air. The author found, however, that the softening of the filter was extremely rapid and was much greater in extent than with smoke, although the temperature in the filter element did not rise above the normal smoking maximum.

Although the author of the above-entitled paper made no further comment about the use of steam-laden air, from my own experience I found that any attempt to use steam to simulate actual smoking through a filter element was ineffective and could not be correlated with actual smoking. Steam released under conditions of atmospheric pressure is laden with too much moisture, far more than what a filter tip would normally be subjected to by a smoker. Also such steam tends to be turbulent and uncontrollable, and subject to spurts and dripping with condensing water. The effectiveness of any filter tip exposed to this raw, uncontrolled steam is literally destroyed.

Collapse measurements, which are made in order to evaluate the collapse resistance imparted by different filter tow items and manufacturing techniques, are typically made with a transducer that converts the linear displacement of a weighted V-shaped foot in contract with a filter tip to a voltage. The weighted V-shaped foot engages the filter 5 millimeters behind the end of the filter tip where the tobacco column is joined. Care is taken to align the seam in the tipping paper away from where the weighted V-shaped foot is to engage the filter tip. The "tipping paper" serves to join the filter tip and the tobacco column together. As the weighted V-shaped foot gradually indents the hot and wetted filter tip of the cigarette being smoked, its displacement is recorded continuously. The displacement of the weighted V-shaped foot is observed at a specified length of unburned tobacco column to compute the percentage decrease in filter tip diameter, or in other words, the percentage of collapse.

A cigarette with its attached filter tip is smoked for collapse measurements by a machine, such as for example, by a single port syringe type smoking machine. The machine is adjusted to achieve standard smoking conditions of a two-second, 35 cubic centimeters (total), bell-shaped puff taken once every 60 seconds. In a "bell-shaped puff," the flow varies sinusoidally with time, going from zero flow at time zero increasing to a maximum flow after one second, and returning to zero flow after two seconds.

Before cigarettes are tested, they are conditioned at 22° C. and at 60% relative humidity for at least 24 hours prior to testing. Testing should also be carried out in an environment controlled to these values. A mark is made on the cork tipping of each cigarette at a point 5 millimeters from the junction of the tobacco column and the filter tip measured in the direction of the mouthpiece end. The mark should be made at 90 degrees to the lap seal. The cigarette is also marked at its standard butt length, i.e., the point to which the cigarette will be smoked for test purposes.

The smoking apparatus is turned on and allowed to warm up prior to its being calibrated. Calibration and linearity of response are then evaluated by inserting circumference standards under the weighted V-shaped foot and recording the output signal of the linear variable differential transformer or transducer (LVDT). Calibration is accomplished, for example, by zeroing the recorder using a standard that is 7.90 millimeters in diameter and adjusting the full scale recorder deflection using a 6.30 millimeters standard. Full scale deflection based upon the calibration corresponds to a collapse of 20% which should be adequate for measuring just about any cellulose acetate filter. If the operator has prior information regarding the expected range of collapse for a set of samples, then the calibration procedure can be modified to give optimum response by choosing standards which just bracket the desired range. Linearity is checked by measuring several standards of intermediate diameter and plotting the output signal of the LVDT versus diameter.

A filter cigarette is inserted into the labyrinth seal of the smoking machine and positioned under the weighted V-shaped foot of the LVDT such that the foot rests on the mark previously made on the filter tip. The recorder is then started, a 15 gram weight is placed on the loading pan of the V-shaped foot, the smoking machine is switched on and the cigarette is lit. The cigarette is smoked to the standard butt length as previously marked and is then extinguished.

The percent filter collapse during smoking is calculated from the following equation:

$$\% \text{ collapse} = 100 \times (b/a)$$

wherein "b" is the depth to which the weighted V-shaped foot penetrated into the filter tip after the last puff and "a" is the filter tip diameter or position of the weighted V-shaped foot prior to lighting the cigarette but after applying the weight. Although the percent collapse is calculated for the last puff taken up to the butt mark, for some applications it may be necessary to observe the collapse profile during smoking in order to describe this behavior as a function of puff number being drawn.

It takes approximately ten (10) minutes to smoke a cigarette by machine and about two to three minutes to prepare another cigarette for smoking. This limits the number of cigarettes that can be tested and analyzed during the course of a normal working day. Consider also the 24 hour conditioning period required before any test may be started.

An object of the invention, therefore, is to reduce significantly the time required to test a filter tip for its resistance against collapse.

Another object of the invention is to improve precision of measurement and separate filter performance from tobacco combustion variables while maintaining high correlation with collapse measured during smoking.

DISCLOSURE OF THE INVENTION

In accordance with the present invention, I provide a method and an apparatus for simulating smoking through a cigarette filter tip and then determining the percent of collapse of the filter tip. The method includes supporting a nonporous wrapped filter tip in sealed relationship in such manner as to provide an inlet passage at one end and an outlet passage at the other end of the filter tip for air flow through the length of the filter tip. A chamber structure is provided and heated to a temperature of about 175° C. to about 225° C. and a path of flow is provided to, through, and from the heated chamber. Air is continuously provided to this path at the rate of 12.5 cubic centimeters per second, and the air is rapidly heated while in the heated chamber. Liquid water is injected into the heated chamber and forms with the heated air a heated water vapor for flow through and from the heated chamber. A second path of flow is provided from the heated chamber to the inlet passage of the filter tip and the flow of heated water vapor is diverted to the second path for a predetermined length of time, such as four seconds, and thereby heating and wetting the filter tip. A weighted V-shape foot of about 12 to about 15 grams is applied in indentation against the heated and wetted filter tip transversely to the length of the filter tip at a predetermined distance from the aforementioned one end of the filter tip. The depth of indentation formed in the heated and wetted filter tip by the weighted foot is measured and the percent of collapse of the filter tip is determined from such measurement.

The liquid water is injected into the heated chamber at the rate of about 290 to about 300 milligrams per minute.

I also provide apparatus for simulating smoking through a nonporous wrapped cigarette filter tip and for determining the percent of collapse thereof to simulate the collapse experienced by a smoker. The apparatus comprises a support arrangement for supporting the filter tip in sealed relationship in such manner as to define an inlet passage at one end and an outlet passage at the other end of the filter tip for air flow through the length of the filter tip. A chamber structure having a chamber is heated to a temperature of about 175° C. to about 225° C. A flow path is provided to, through, and from the heated chamber and a continuous flow of air is provided to the flow path at the rate of 12.5 cubic centimeters per second, with the air being heated while in the heated chamber. An injection arrangement is provided for injecting liquid water into the heated chamber and thereby forming with the heated air a heated water vapor. A second path of flow is provided from the heated chamber to the inlet passage of the filter tip and a diverting arrangement is provided for diverting for a predetermined length of time, preferably four seconds, the flow of heated water vapor to the second path and thereby heating and wetting the filter tip. A weighted V-shaped foot having a weight of about 12 to about 15 grams is applied in indentation against the heated and wetted filter tip at a predetermined distance from the aforementioned one end of the filter tip. An arrangement is provided for measuring the depth of indentation formed in the heated and wetted filter tip by the weighted V-shaped foot and the percent of collapse of the filter tip is determined therefrom.

The injection arrangement comprises a syringe having a piston and a motor arrangement for driving the piston at a predetermined controlled rate, as for instance so that the liquid water is injected at the rate of about 290 to about 300 milligrams per minute. The arrangement for diverting for a predetermined length of time the flow of heated water vapor to the second path includes a solenoid controlled valve and a timer.

BRIEF DESCRIPTION OF THE DRAWINGS

The details of my invention will be described in connection with the accompanying drawings, in which.

BEST MODE FOR CARRYING OUT THE INVENTION

Figure 1:
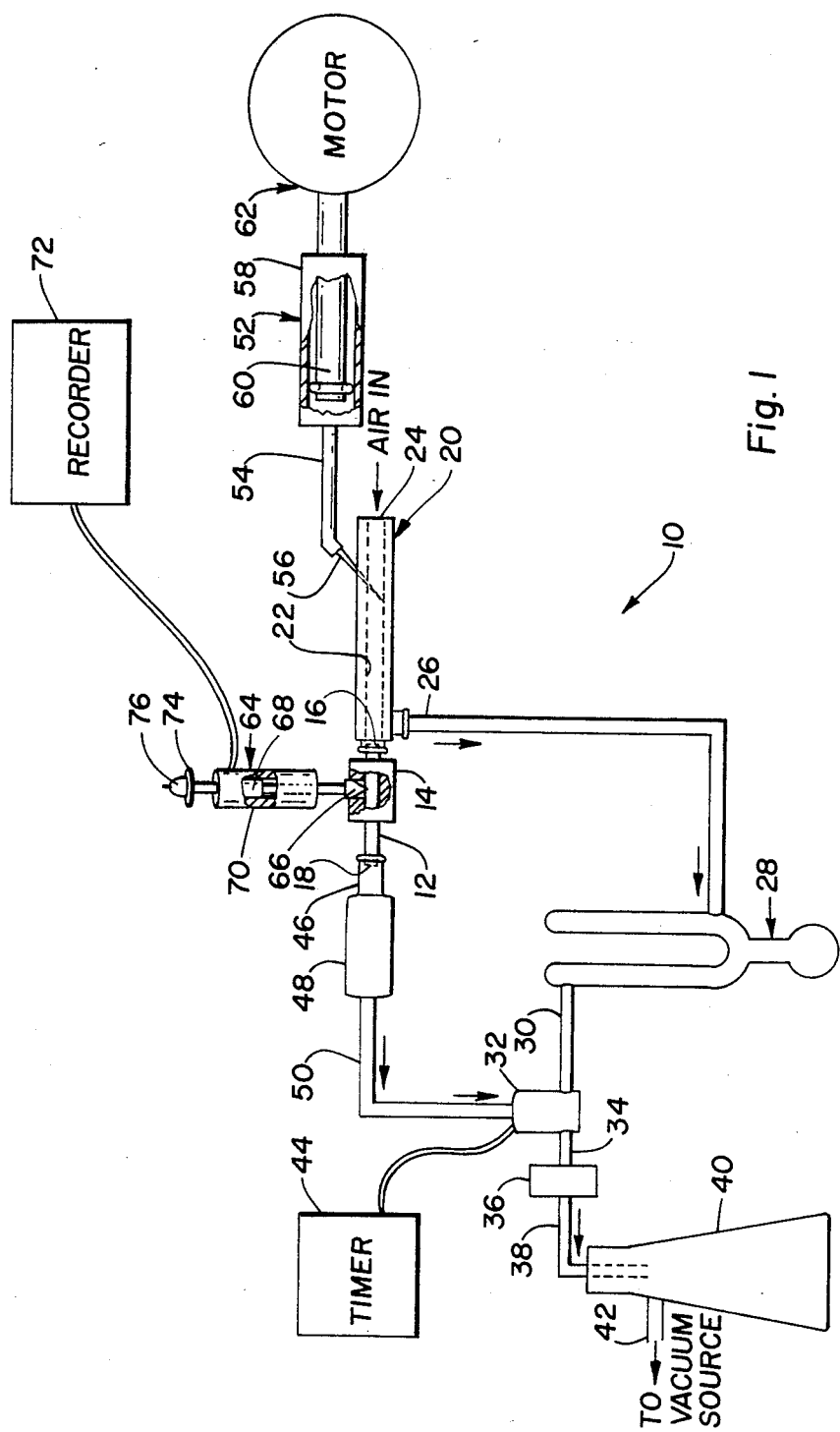
FIG. 1 is an elevational view in schematic form illustrating the apparatus of the smoking simulator and collapse tester of the invention.

In reference to the drawings, the smoking simulator and collapse tester of my invention is shown at 10. A nonporous wrapped cigarette filter tip 12, i.e. without any tobacco column being attached thereto, is supported along a portion of its length by a support 14. By "nonporous wrapped" it is meant that the filter material, such as cellulose actate, is either wrapped with what is known in the industry as a "plug wrap" (which may be porous or nonporous, but for purposes of this invention must be nonporous when by itself so as to confine air flow through the length of the filter tip) or by a plug wrap and a nonporous tipping paper. "Tipping paper" is the paper used to wrap both the tobacco column and filter element together to form the cigarette.

The opposite ends of the filter tip pass through supported labyrinth seals, which may be thin rubber sheets or "dental dams" stretched over the ends of respective conduits and secured thereto by O-rings. The labyrinth seals each have a hole formed therein smaller than the diameter of the filter tip so as to ensure a tight seal at each end of the filter tip and to define an inlet passage 16 at one end of the filter tip and an outlet passage 18 at the other end of the filter tip.

A heated chamber structure 20 is provided adjacent the filter tip support 14. The chamber structure has a chamber 22, which extends the length of the chamber structure; an inlet opening 24, which is open to the atmosphere and leads into the chamber 22 from one end of the chamber structure; and a conduit 26, which leads from the chamber 22 at the other end of the chamber structure.

The chamber 22 is heated by any suitable means to a temperature of about 175° C. to about 225° C. and is connected in a manner to be described to a source of vacuum so that an air flow path is provided to, through, and from the chamber 22. Air drawn from the atmosphere through inlet opening 24 and into chamber 22 is rapidly heated within the chamber by the heated chamber structure 20.

The heated chamber structure 20 is connected to a vacuum source (not shown) in the following manner. The aforementioned conduit 26 is connected to a dry ice trap 28, which collects any water in the air flow and is in turn connected to a conduit 30 that leads to a three-way solenoid valve 32 (such as Skinner three-solenoid valve number V53DB2050). The three-way solenoid valve, which normally remains open for the path of air flow described above, is connected to a conduit 34 leading to a needle valve 36, the latter being a Brooks rotameter, which is adjusted to provide a 12.5 cubic centimeters per second flow through the three-way valve to, through, and from the heated chamber 22. The needle valve is connected by conduit 38 to a two-liter surge tank 40, which serves to provide for a constant vacuum and to moderate slight fluctuations.

The heated chamber 22 is also connected to the vacuum source along a second path of air flow in the following described manner. Air flow from the chamber 22 is diverted to flow to the inlet passage 16 of the filter tip, through the filter tip and out the outlet passage 18 of the filter tip for subsequent flow through conduit 46, which leads into a calcium chloride drying tube 48, which collects any water in the flow therethrough. From the latter the air flow passes into conduit 50, which leads into the aforementioned three-way solenoid valve 32.

Liquid water is injected into the heated chamber where it, too, is rapidly heated and forms with the heated air a heated water vapor in the following described manner. A water syringe 52 is connected at one end to a ⅛ inch conduit 54, the latter in turn being connected to a hypodermic needle 56 leading into chamber 22. The water syringe comprises a cylinder 58 and a piston 60 reciprocably movable within the cylinder. The water syringe at the other end from the conduit 54 is operably connected through its piston to a screwdrive powered by a variable speed motor, the screw drive and motor being shown only schematically at 62. The variable speed motor (such as Bodine right-angle gearmotor, 130 volt DC, Model 144, catalog type 32D5BEPM-5F, 60 to 1 ratio, manufactured by B&B Motor and Control Corp.) is capable of producing a reproducible stroke. The water syringe 52 under control of the screw drive and motor serves to inject a controlled amount of liquid water, at the rate of about 290 to about 300 milligrams per minute through the conduit 54 and hypodermic needle 56 and into the chamber 22.

In operation of the apparatus described thus far, the chamber structure is allowed to come to operating temperature, which is about 175° C. to about 225° C., and by means of the vacuum source (not shown) a continuous air flow passes into the inlet opening 24 and through heated chamber 22 and out of the chamber through the conduit 26 for subsequent flow through the dry ice trap 28, conduit 30, the three-way solenoid valve 21, conduit 34, the needle valve 36, conduit 38, the two-liter surge tank 40 and conduit 42 leading to the vacuum source. The needle valve 36 is adjusted to provide a 12.5 cubic centimeter per second flow.

Liquid water is caused to be injected into the heated chamber where, as mentioned previously, it is rapidly heated and forms with the heated air flow a heated water vapor, which flows out of the chamber along the first-mentioned flow path. The heated water vapor flow is allowed to stabilize for approximately 20 seconds and then the timer 44 actuates the three-way solenoid valve so that it closes the flow to the first-mentioned flow path and causes the flow to be diverted to the second-mentioned flow path and through the filter tip for about four seconds.

It is important to point out that the heated water vapor flow is essentially a laminar flow, and is not turbulent as would be the case for the afore-described example of steam-laden air. Therefore, the chamber must be sized appropriately for the flow rates being used to ensure laminar flow. Also, unlike steam-laden air with its overload of water, the heated water vapor flow is controlled with just enough moisture to essentially simulate the effect that filter tip would normally be subjected to if a cigarette were being smoked.

The collapse tester itself is essentially conventional in the art and comprises a linear variable differential transformer or transducer (LVDT) 64 and a weighted V-shaped foot 66, which is connected at one end of a core 68 movable within the transformer body 70. The LVDT is electrically connected to a suitable recorder 72. The LVDT converts any displacement of the weighted V-shaped foot into the filter element into a proportional voltage signal which can be recorded.

When the heated water vapor is diverted (for about four seconds) to flow through the filter tip, the heat and the moisture associated with the flow through the filter tip tends to wet and soften the filter tip. The V-shaped foot 66, which engages the filter tip, is weighted with about 12 to about 15 grams and its gradual indentation into the heated and wetted filter tip simulates the degree of collapse experienced by the smoker. A loading pan 74 is shown at the top of the movable core 68 with the weight 76.

Each test lasts for about one minute. About 20 seconds is allowed for the heated water vapor to flow along the first flow path and to become stabilized. Then the heated liquid vapor is diverted to flow along the second path through the filter tip for four seconds. About 30 seconds is allowed for the filter tip to come to equilibrium following the four-second flow therethrough before the resulting indentation is recorded. It takes about four to five seconds to remove a tested filter tip and place another filter tip within the labyrinth seals. The operator can set up a sequence at his or her own speed so as to initiate a liquid water injection approximately 20 seconds before the timer 44 activates closing of the three-way valve to divert flow through the filter tip.

Figure 2:
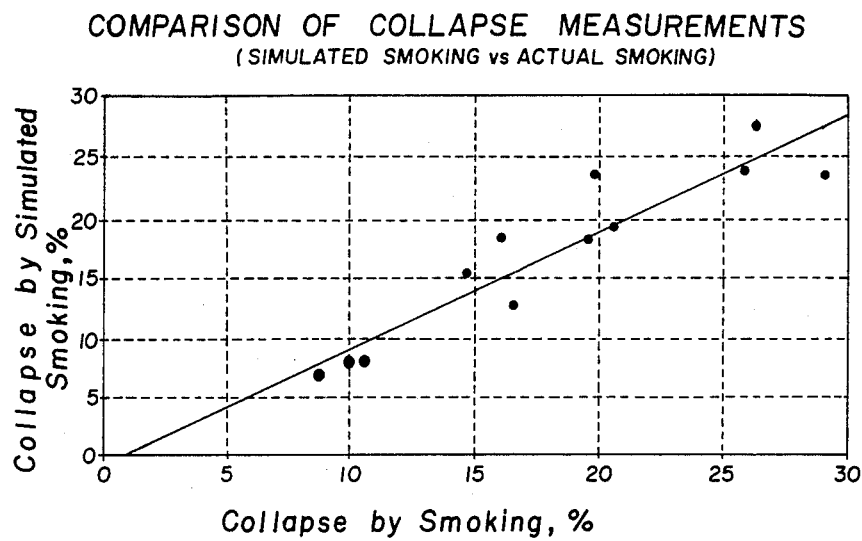
FIG. 2 is a graph illustrating correlation of the simulated smoking for the filter tip versus actual smoking of a cigarette by a machine.

The graph shown in FIG. 2 shows how well operation of the above-described invention predicts filter collapse by smoking. The graph represents an experiment comprising comparing the collapse measured by simulated smoking to the collapse measured by smoking of ten filter tips from each of twelve filter tip specifications spanning a range of denier per filament, total deniers, and filter tow weights. The graph shows a plot of the average values of collapse by simulated smoking collapse test versus the average values of collapse during smoking for each filter tip specification. The best fit line is drawn through the data and the equation of this line and its associated statistics are also shown in the graph. A perfect correlation between the two tests would have a correlation coefficient of 1.0 and the equation for the best line through the data would be an intercept of zero and a slope of one. In other words, collapse by simulated smoking would exactly equal collapse by smoking for each measurement. This experiment resulted in a best fit line equation which was not statistically significantly different from a perfect correlation, although the correlation coefficient was less than 1.0. This less than ideal correlation coefficient probably results from the variability of the collapse measurements. Nonetheless, these results demonstrate that the collapse measured by simulated smoking yields values which are statistically indistinguishable from collapse values obtained by smoking.

Figure 3:
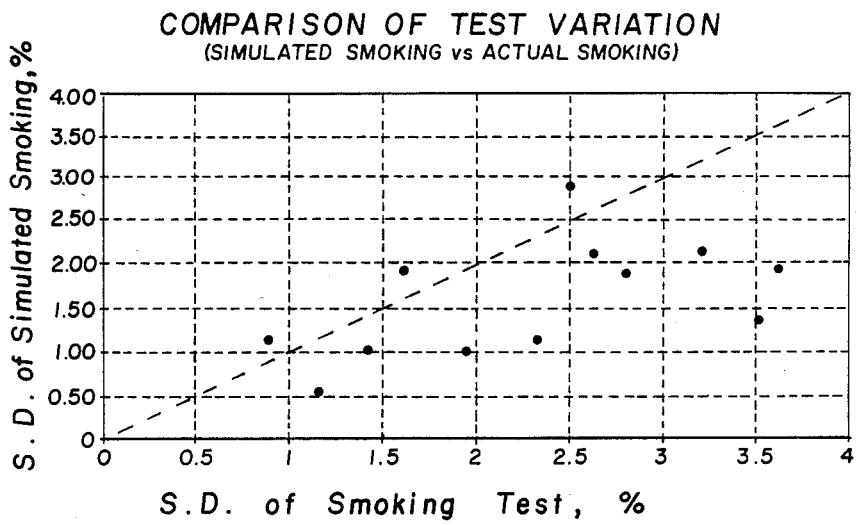
FIG. 3 is a graph illustrating a comparison of test variation between the simulated smoking collapse test versus Smoking Test.

The graph shown in FIG. 3 shows a comparison of the filter tip to filter tip variation of collapse measured by simulated smoking and acutal smoking tests. The same filter specifications were used to generate the data shown in the graphs of FIGS. 2 and 3. The test variation shown in the graph of FIG. 3 is expressed as the standard deviation (S.D.) of percent collapse. As was true for the comparison of average collapse values, an exact correlation between the filter tip to filter tip standard deviation of collapse measured by both techniques would result in a straight line with a slope of one and an intercept of zero. The hypothetical exact correlation is shown by the dashed line in the graph. It is evident, however, that the variability data shown here does not lie on the exact correlation line, but rather deviates systematically from this line. Most of the points lie to the right of the line indicating that for a given filter specification the filter tip to filter tip standard deviation of collapse measured by smoking is significantly greater than collapse measured by simulated smoking. Comparison of the pooled standard deviation for these two measurements shows that the simulated smoking reduces the standard deviation of collapse by about 32%. Pairwise comparisons of each filter specification indicate that the improvement in the filter tip to filter tip standard deviation achieved by simulated smoking is about 27%, although these two numbers are not statistically different. This improvement in test evaluation is accomplished by the elimination of sources of variation such as the tobacco column, cigarette construction, and combustion processes.

The invention has been described in detail with particular reference to preferred embodiments thereof, but it will be understood that variations and modifications can be effected within the spirit and scope of the invention.

I claim:

1. Method for simulating smoking through a nonporous wrapped cigarette filter tip and for determining the percentage of collapse thereof to simulate the collapse experienced by a smoker, said method comprising:

supporting said filter tip in sealed relationship in such manner as to provide an inlet passage at one end and an outlet passage at the other end of the filter tip for air flow through the length of said filter tip, providing a chamber structure having a chamber heated to a temperature of about 175° C. to about 225° C., providing a path of flow to, through and from said chamber, continuously providing said path air at the rate of about 12.5 cubic centimeters per second, and rapidly heating said air while in said chamber, injecting liquid water into said heated chamber and forming with said heated air a heated water vapor for flow through and from said chamber, providing a second path of flow from said heated chamber to the inlet passage of said filter tip and diverting said flow of heated water vapor to said second path for a predetermined length of time and thereby heating and wetting said filter tip, applying a weighted V-shaped foot of about 12 to about 15 grams in weight in indentation against said heated and wetted filter tip transversely to the length of said filter tip at a predetermined distance from said one end of the filter tip, and measuring the depth of indentation formed in the heated and wetted filter tip by said weighted foot and determining therefrom said percentage of collapse of said filter tip.

2. Method as defined in claim 1 wherein said liquid water is injected into said heated chamber at the rate of about 290 to about 300 milligrams per minute.

3. Method as defined in claim 1 wherein said flow of heated water vapor is diverted for about 4 seconds to and through said filter tip.

4. Apparatus for simulating smoking through a nonporous wrapped cigarette filter tip and for determining the percentage of collapse thereof to simulate the collapse experienced by a smoker, said apparatus comprising:

support means for supporting said filter tip in sealed relationship in such manner as to define an inlet passage at one end and an outlet passage at the other end of the filter tip for air flow through the length of said filter tip, a chamber structure having a chamber heated to a temperature of about 175° C. to about 225° C., means defining a flow path to, through and from said heated chamber, and means for providing to said flow path a continuous flow of air at the rate of about 12.5 cubic centimeters per second, said air being heated while in said heated chamber, injection means for injecting liquid water into said heated chamber and thereby forming with said heated air a heated water vapor, means defining a second path of flow from said heated chamber to the inlet passage of said filter tip and means for diverting for a predetermined length of time said flow of heated water vapor to said second path and thereby heating and wetting said filter tip, a weighted V-shaped foot having a weight of about 12 to about 15 grams and means for applying said weighted foot in indentation against said heated and wetted filter tip transversely to the length of said filter tip at a predetermined distance from said one end of the filter tip, and means for measuring the depth of indentation formed in the heated and wetted filter tip by said weighted foot and for determining therefrom said percentage of collapse of said filter tip.

5. Apparatus as defined in claim 4 wherein said injection means comprises a syringe having a piston and means for driving said piston at a predetermined controlled rate.

6. Apparatus as defined in claim 5 wherein said driving means drives said piston so that liquid water is injected at the rate of about 290 to about 300 milligrams per minute.

7. Apparatus as defined in claim 4 wherein said means for diverting for a predetermined length of time said flow of heated water vapor includes a solenoid controlled valve and a timer means.

* * * * *